United States Patent
Huang et al.

(10) Patent No.: US 6,980,979 B2
(45) Date of Patent: Dec. 27, 2005

(54) METHOD AND APPARATUS FOR CUSTOMIZING JAVA API IMPLEMENTATIONS

(75) Inventors: Shuangying Huang, Sunnyvale, CA (US); Michael Bundschuh, Menlo Park, CA (US); Ivan Wong, San Jose, CA (US); Amith Yamasani, San Jose, CA (US); Babu Srinivasan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 523 days.

(21) Appl. No.: 09/956,713

(22) Filed: Sep. 19, 2001

(65) Prior Publication Data

US 2003/0056029 A1 Mar. 20, 2003

(51) Int. Cl.[7] .............................................. H06F 17/30
(52) U.S. Cl. .............................................. 707/2; 707/1
(58) Field of Search ........................ 707/1, 10, 2, 102, 707/104.1, 103 R, 204; 709/217, 219, 236; 717/111, 116, 118, 147, 148, 166

(56) References Cited

U.S. PATENT DOCUMENTS

| 5,551,028 A | * | 8/1996 | Voll et al. ................ 707/103 R |
| 5,671,412 A | * | 9/1997 | Christiano ................ 707/104.1 |
| 6,286,051 B1 | * | 9/2001 | Becker et al. ............... 709/236 |
| 6,513,040 B1 | * | 1/2003 | Becker et al. ................ 707/10 |
| 6,560,618 B1 | * | 5/2003 | Ims ............................ 707/204 |

OTHER PUBLICATIONS

Yuanyuan Zhao et al., Exploiting Event Stream Interpretation in Publish–Subscribe Systems, Sep. 2001, ACM, pp. 21 228.*

Frank Tip et al., Practical Extraction Techniques for Java, Nov. 2002, ACM, vol. 24, No. 6, pp. 625–666.*

* cited by examiner

Primary Examiner—Apu Mofiz
(74) Attorney, Agent, or Firm—Martine Penilla & Gencarella, LLP

(57) ABSTRACT

A method and system is provided for customizing Java API implementations. A plurality of class files is obtained, wherein the class files are capable of being used together to provide a plurality of functional behaviors to an application. A feature marker is then associated with each of the class files based on a functionality provided by the class file. Each feature marker indicates a particular functionality provided by the plurality of class files. Particular class files are then selected from the plurality of class files based on the feature markers associated with the particular class files. The plurality of class files can comprise a first JAR file, and the selected class files can be used to generate a second JAR file. The second JAR file can also exclude class files that are not selected. Further, non-Java based native files, if any, utilized by the plurality of class files can also be customized to a subset of the original native files in a similar manner.

15 Claims, 13 Drawing Sheets com/sun/media/renderer/video/AWTRenderer.class:
    com/sun/media/BasicPlugIn.class
    com/sun/media/util/Arch.class
    Javax/media/*.class
    Javax/media/format/RGBFormat.class
    Javax/media/format/VideoFormat.class
    com/sun/media/renderer/video/BasicVideoRenderer.class:
     com/sun/media/renderer/video/Blitter.class

FIG. 7B com/sun/media/renderer/video/AWTRenderer.class:
    com/sun/media/BasicPlugIn.class
    com/sun/media/util/Arch.class
    Javax/media/*.class
    Javax/media/format/RGBFormat.class
    Javax/media/format/VideoFormat.class
    com/sun/media/renderer/video/BasicVideoRenderer.class
    com/sun/media/renderer/video/Blistter.class
    com/sun/media/renderer/video/Java2DRenderer.class

FIG. 7C com/sun/media/renderer/audio/JavaSoundRenderer.class:
    com/sun/media/JMFSecurityManager.class
    com/sun/media/MediaEngine.class
    com/sun/media/controls/GainControlAdapter.class
    com/sun/media/renderer/audio/device/AudioOutput.class
    com/sun/media/renderer/audio/device/JavaSoundOutput.class
    Javax/media/*.class
    Javax/media/format/AudioFormat.class
    com/sun/media/renderer/audio/AudioRenderer.class

FIG. 7D com/sun/media/renderer/audio/JavaSoundRenderer.class:
    com/sun/media/JMFSecurityManager.class
    com/sun/media/MediaEngine.class
    com/sun/media/controls/GainControlAdapter.class
    com/sun/media/renderer/audio/device/AudioOutput.class
    com/sun/media/renderer/audio/device/JavaSoundOutput.class
    Javax/media/*.class
    Javax/media/format/AudioFormat.class
    com/sun/media/renderer/audio/AudioRenderer.class
    jmutil.dll
    jsound.dll
    libjmutil.so
    libjsound.so

FIG. 7E

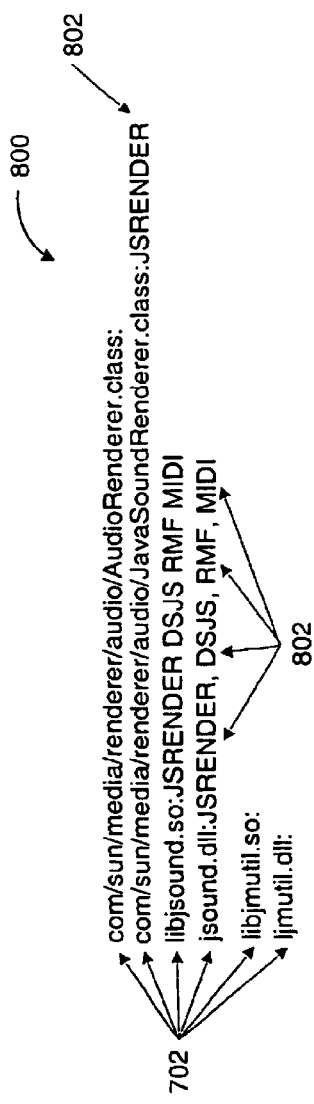
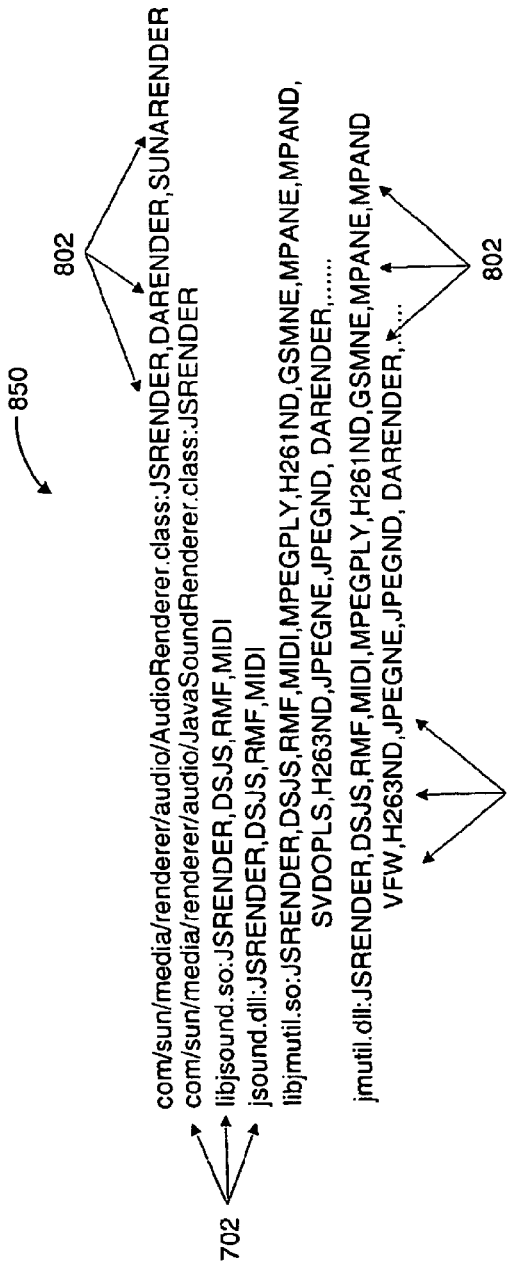

METHOD AND APPARATUS FOR CUSTOMIZING JAVA API IMPLEMENTATIONS

BACKGROUND OF THE INVENTION

1. Field of the Invention

The present invention relates generally to Java API implementation, and more specifically, to methods and apparatuses for customizing Java API implementations tailored for the specific needs of a given Java application.

2. Description of the Related Art

Java, originally developed by Sun Microsystems, is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser or applet viewer. In the following description, the term "application" will be used synonymously with the term "applet."

Java accomplishes platform independence through an intermediate computing state. Java source code is compiled into a machine-independent byte code, which generally is interpreted before being run on a native instruction set of the target processor. The interpretation is done through a Java Virtual Machine (JVM), a software layer that forms a bridge between the byte code and actual hardware. The JVM takes system calls and interprets them into corresponding machine instruction. Java allows developers to use the most productive development environment available, irrespective of platform. Thus, there is no need to develop on the same platform as the target platform or worry about cross-compiling, since a Java program will run on any processor having a JVM.

Java also offers advantages during programming. Memory management is far simpler, and program bugs are fewer, because Java uses references in place of pointers. A reference is an abstract identifier for an object. A reference tags a particular object with a name in the Java Virtual Machine so that the developer may refer to it. At the level of machine code in a CPU, a reference is an address in memory where the address of the object is stored. In this way, the objects can be moved around in memory and only the master pointer needs to be updated rather than all references to the object. This is completely hidden from the Java developer. All memory is dynamically allocated, as a variable is instantiated, but access to individual memory addresses violates the Java security model and is not permitted. Java reclaims memory through automated garbage collection. As memory is allocated, a variable or structure in the language references the memory. The garbage collector searches for unreferenced memory, which it reclaims and adds to the free memory list, releasing developers from memory management worries.

Java is a pure object-oriented language. Every variable is an object in the class hierarchy and has a set of predefined methods, or functions, that can be used to operate it. The object model lets developers define data structures corresponding to real-life objects, making the translation between what a program has to do and how it's implemented transparent.

To concatenate and compress these Java objects, classes, image, audio and other information, Java employs a platform independent file format called a Java archive (JAR) file. One of the main attributes of the JAR file design is to reduce the number of HyperText Transfer Protocol (HTTP) connections that need to be opened, thus reducing download times. For example, FIG. 1 is an illustration showing a prior art network system 100 having Java JAR file 104a and the manner in which the JAR file can be accessed over the Internet. The network system 100 includes a desktop computer 102 coupled to the Internet 106 via a network communication protocol. In the example of FIG. 1, the JAR file 104a includes class files used to create a Java based media player. To access the media player class files, the user computer downloads the JAR file 104a, resulting in the user computer obtaining a copy of the JAR file 104b. The user can then decompress and utilize the classes contained in the JAR file in creating a Java based media player.

However, in many situations, the user does not utilize all the functionality provided by the classes of the JAR file in creating an application based on the JAR file. For example, the user in FIG. 1 may not need to have the functionality to play all the media formats provided by the classes of the JAR file 104b. In this case, the unused classes in the JAR file are wasted. Further, the extra storage needed to store the unused classes and the extra time required to download the unused classes is likewise wasted.

In view of the foregoing, there is a need for techniques that allow a user to customize a JAR file based on the functionality needed by a particular application. The user should be allowed to select the functionality needed without needing to know the exact classes required to allow the selected functionality. Moreover, the resulting customized JAR file should maintain compatibility with the corresponding application program interface (API) associated with the framework of the JAR file.

SUMMARY OF THE INVENTION

Broadly speaking, the present invention fills these needs by providing techniques for customizing Java API implementations. The embodiments of the present invention allow a user to select the functionality needed from a JAR file to implement a particular application. A new customized JAR file of a reduced size can be created that provides the selected functionality while removing class files not needed to provide the selected functionality. Similarly, non-Java based native files, if any, utilized by the JAR file can also be customized to a subset of the original native files. In one embodiment, a plurality of class files is obtained that are capable of being used together to provide a plurality of functional behaviors to an application. A feature marker is then associated with each of the class files based on a functionality provided by the class file. Each of the feature markers indicates a particular functionality provided by the plurality of class files. Particular class files are then selected from the plurality of class files based on the feature markers associated with the particular class files.

A further method for customizing an API implementation is disclosed in another embodiment of the present invention. A plurality of class files is extracted from a first JAR file. The extracted class files are capable of being used together to provide a plurality of functional behaviors to an application. In addition, a link file listing interdependencies of the class files of the plurality of class files is generated. The plurality of class files also can be analyzed to determine dependencies on non-Java based native module files to extend the link file. Utilizing the link file, a feature marker is associated with particular class files of the plurality of class files. More specifically, class files dependent on a particular class file are associated with the same feature marker, which indicates a particular functionality provided by the plurality of class files. Particular class files are then selected from the plurality of class files based on the feature markers associated with the particular class files. Similarly, the feature marking and file selecting operations can be applied to native files, if any, utilized by the plurality of class files.

In a further embodiment, a computer program embodied on a computer readable medium for customizing an API implementation is disclosed. The computer program includes a code segment that receives a plurality of class files, wherein the class files are capable of being used together to provide a plurality of functional behaviors to an application. In addition, a code segment is included that associates a feature marker with each class file based on a functionality provided by the class file, wherein each feature marker indicates a particular functionality provided by the plurality of class files. The computer program also includes a code segment that selects particular class files from the plurality of class files based on the feature markers associated with the particular class files. In one aspect, the above mentioned code segments also can perform the feature marking and file selecting operations to native files, if any, which are utilized in conjunction with the plurality of class files. Other aspects of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIGS. 7A, 7B, 7C, 7D, and 7E are diagrams showing a portion of an exemplary text link file, in accordance with an embodiment of the present invention;

FIG. 8 is a diagram showing a portion of an exemplary feature file, in accordance with an embodiment of the present invention;

FIG. 9 is a diagram showing an updated feature file, in accordance with an embodiment of the present invention;

DETAILED DESCRIPTION OF THE PREFERRED EMBODIMENTS

An invention is disclosed for customizing Java API implementations. The present invention allows a user to select the functionality needed from a JAR file to implement a particular application. A new customized JAR file of a reduced size is created that provides the selected functionality by removing class files not needed to provide the selected functionality. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
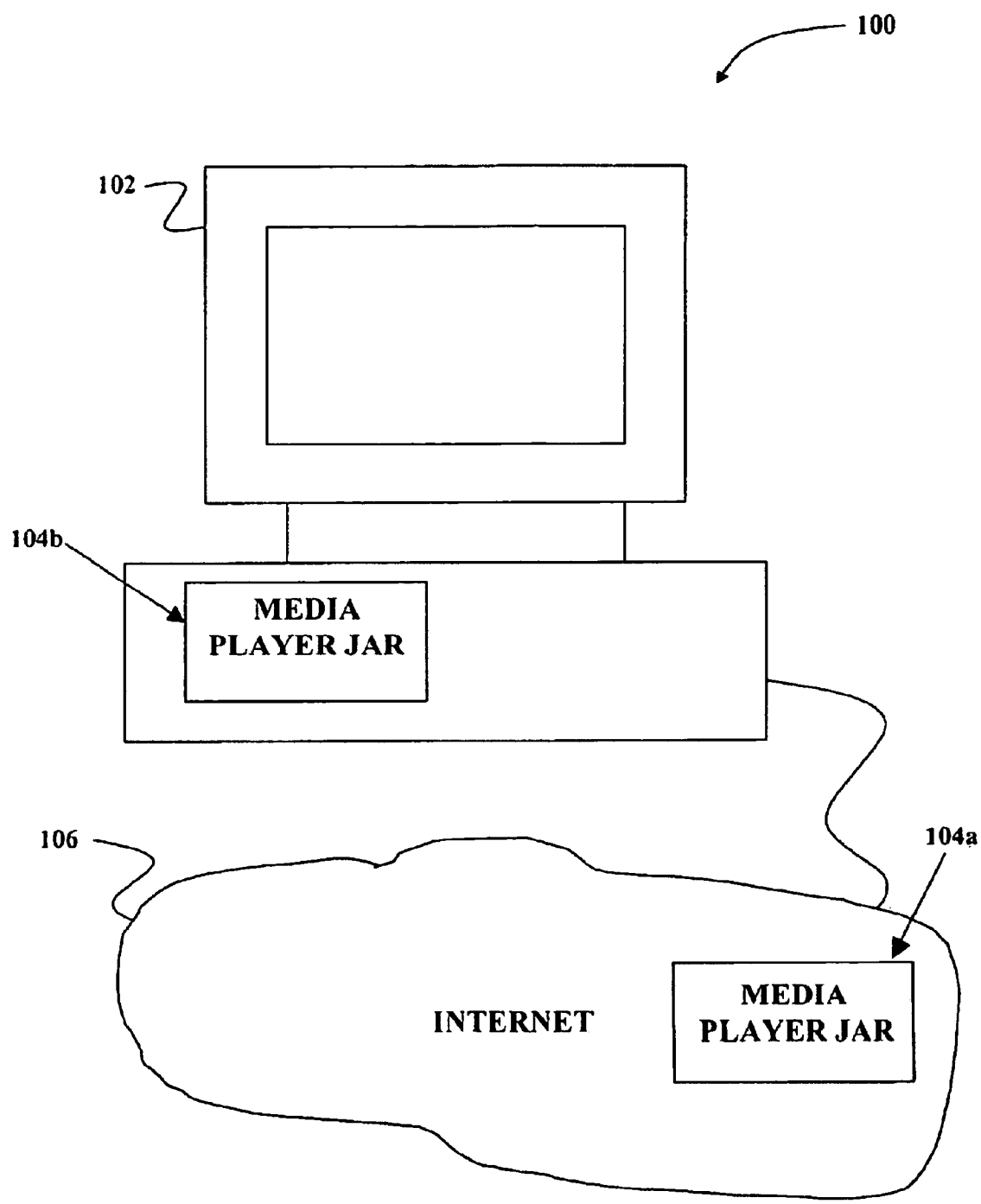
FIG. 1 is an illustration showing a prior art network system having Java JAR file and the manner in which the JAR file can be accessed over the Internet.
Figure 2:
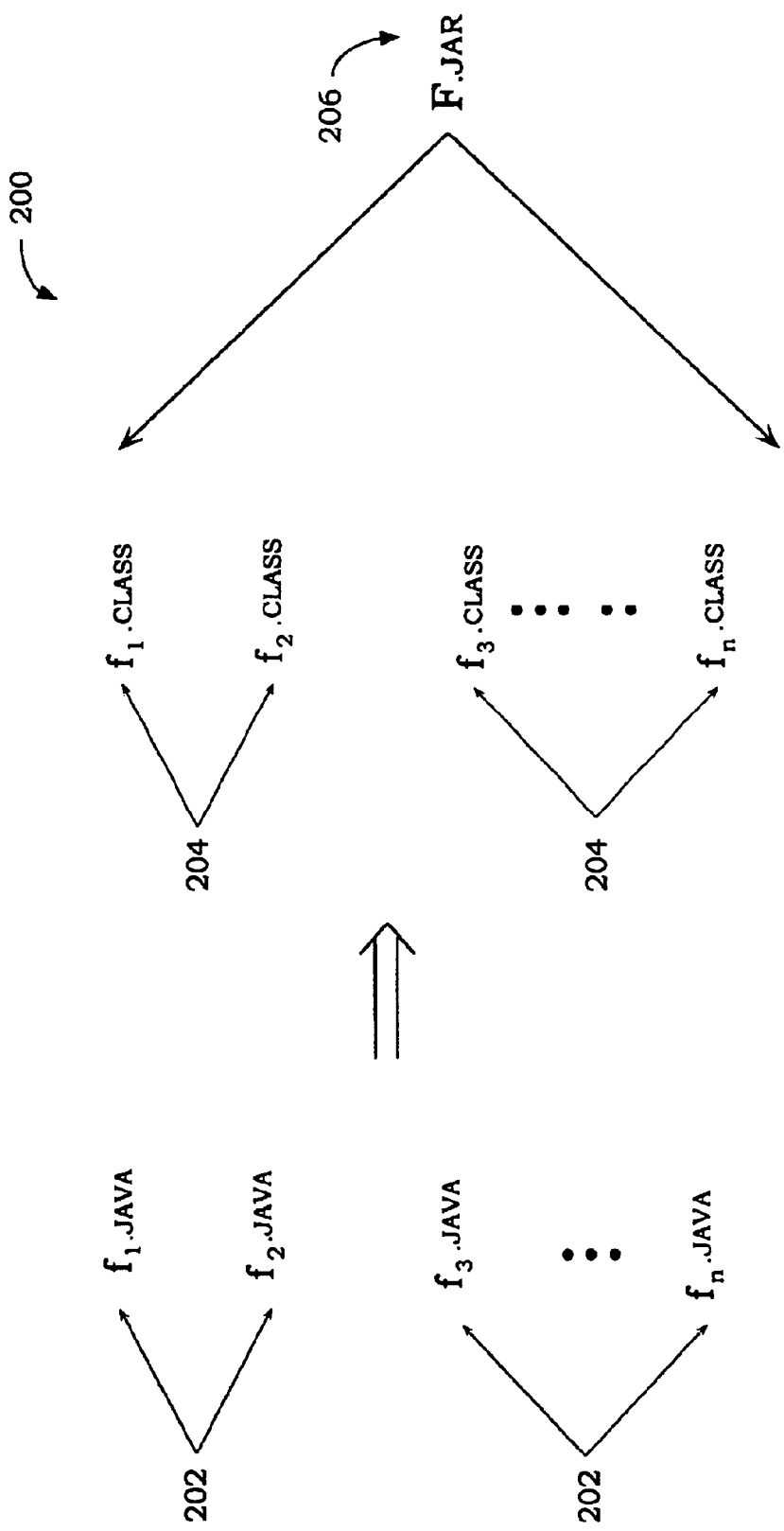
FIG. 2 is a diagram showing a method for creating a JAR file.

FIG. 1 was described in terms of the prior art. FIG. 2 is a diagram showing a method 200 for creating a JAR file 206. As shown in method 200, a developer first creates a plurality of Java source files 202, which include the Java source code for the classes used in a particular implementation. Unlike most programming languages, in which a program is compiled into machine-dependent, executable program code, Java classes are compiled into machine independent byte-code class files 204 which are executed by a machine-dependent virtual machine. The virtual machine provides a level of abstraction between the machine independence of the byte-code classes 204 and the machine-dependent instruction set of the underlying computer hardware. A class loader is responsible for loading the byte-code class files 204 as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode." The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Although the present invention is described based on the Java programming language, other programming languages may be used to implement the embodiments of the present invention, such as other object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class. A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Referring back to FIG. 2, the byte-code class files 204 are combined and compressed into a JAR file 206. As mentioned previously, Java employs a platform independent file format that concatenates and compresses many Java classes, image, audio and other information into one file called a JAR file. One of the main attributes of the JAR file design is to reduce the number of HTTP connections that need to be opened, thus reducing download times. The file format for the JAR file 206 is the popular ZIP format and can be used as a general archiving tool. In addition, the JAR archive file 206 may include a Manifest file that includes information regarding the structure of the other files within the JAR file 206. An application that uses the JAR file 206 can then access the structure information included in the Manifest file.

As previously mentioned, embodiments of the present invention allow a user to select the functionality needed from the JAR file 206 to implement a particular application. A new customized JAR file of a reduced size is then created that provides the selected functionality while removing class files not needed to provide the selected functionality.

Figure 3:
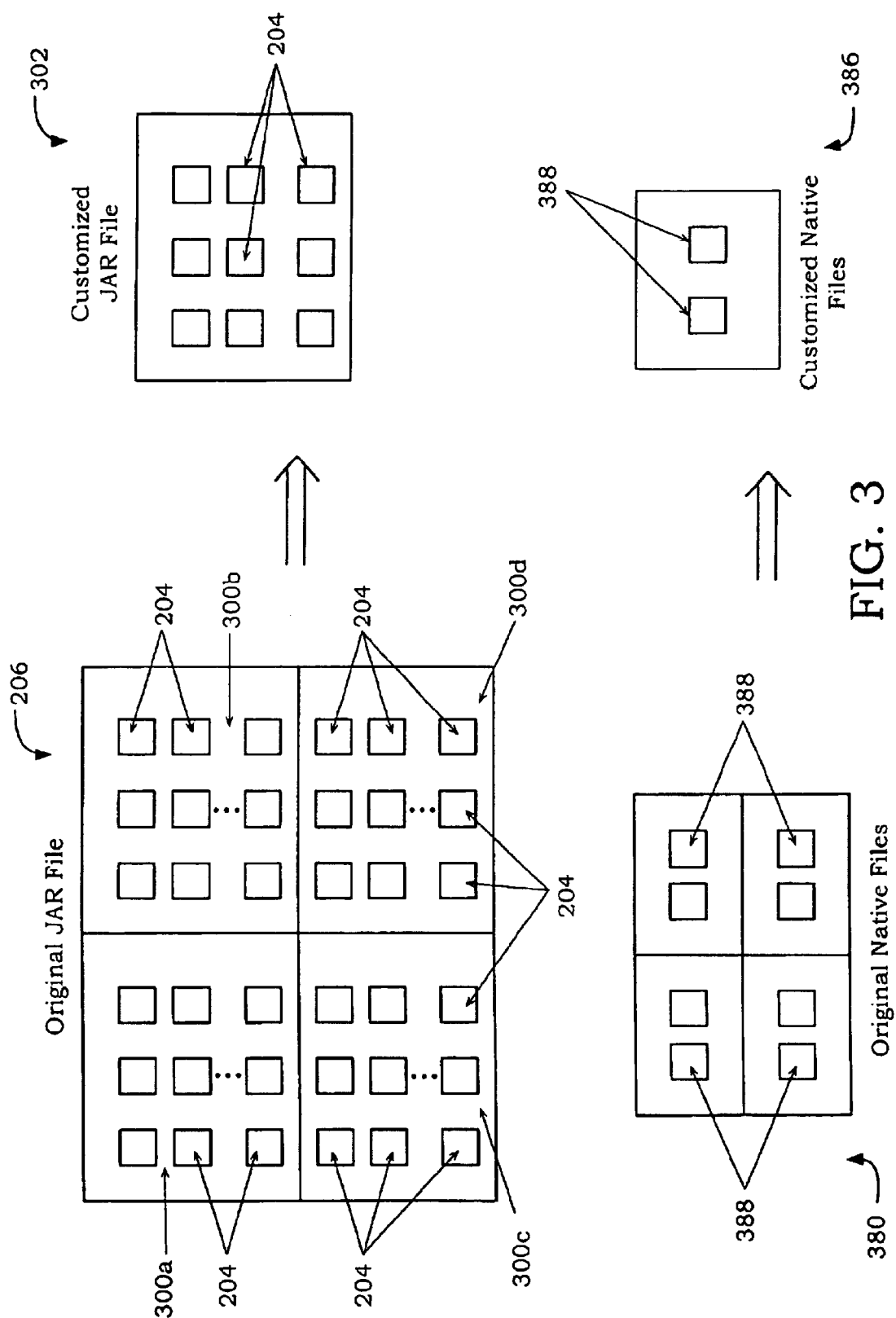
FIG. 3 is a block diagram illustrating JAR customization, in accordance with an embodiment of the present invention.

FIG. 3 is a block diagram illustrating JAR customization, in accordance with an embodiment of the present invention. To provide customization, the embodiments of the present invention analyze the JAR file 206 to determine the functionality and interdependencies of the class files 204 comprising the original JAR file 206. In particular, embodiments of the present invention can logically group the class files 204 into functional sets 300a–300d that are required to provide a particular function. Although FIG. 3 shows each class file 204 belonging to only one functional set 300a–300d, it should be noted that class files 204 may belong to multiple functional sets 300a–300d.

In this manner, the embodiments of the present invention can determine which class files 204 are needed to implement the functionality requested by the user. Further, embodiments of the present invention can enforce any Java API rules associated with the Java framework implemented by the class files 204 of the JAR file 206. In addition, the non-Java based native module files 380 required by the JAR file can also be customized down to a subset of the original native module files 386. For example, a WINDOWS based system may require specific .dll files to implement particular features of an application. In these circumstances, embodiments of the present invention can identify a set of native files 388 needed by original JAR file 206, and further determine which non-Java based native files 388 are required to implement the requested functionality. The list 386 of these required native files can be generated along with customized JAR 302.

Once the original JAR file 206 has been analyzed, and the user has selected the functionality needed, embodiments of the present invention generate a customized JAR file 302. The customized JAR file 302 includes the class files 204, and the list of required native files 386 to implement the requested functionality and maintain API compatibility.

Figure 4:
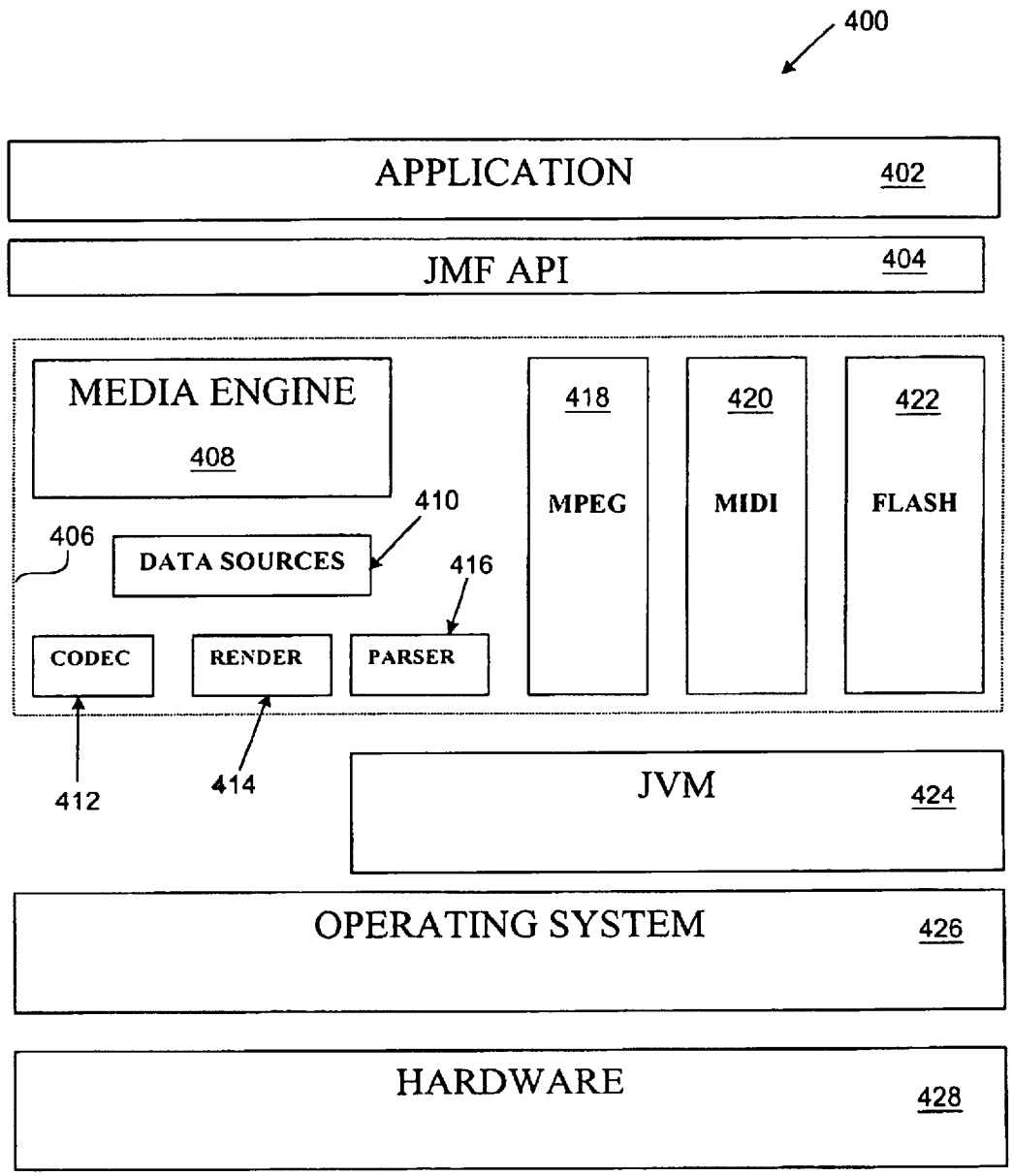
FIG. 4 is a block diagram showing a multimedia framework system.

For example, FIG. 4 is a block diagram showing a multimedia framework system 400. The multimedia framework system 400 includes an application layer 402, a Java multimedia framework API 404, a Java multimedia framework module 406, a Java virtual machine layer 424, an operating system layer 426, and a hardware layer 428. The Java multimedia framework module 406 includes a media engine 408, data sources 410, a codec 412, renderer 414, and a parser 416. Also included in the Java multimedia framework module 406 are a MPEG module 418, a MIDI module 420, and a FLASH module 422.

The a Java multimedia framework module 406 is a set of multimedia implementations designed to playback multimedia in a variety of protocols and formats, such as a QuickTime Cinepak movie over the HTTP protocol. Within the Java multimedia framework module 406 are implementations of the three main stages of the media processing pipeline: the parser 416, the decoder 412 and the renderer 414. The parser 416 transforms the media data into a compressed and/or encoded media data file or stream. Decoder (codec) 412 transforms the compressed and/or encoded media data into raw (decompressed and unencoded)

media data for use by renderer 414. Renderer 414 processes the raw media data into media output for display or presentation on an output device, such as a monitor for graphics or a speaker for audio.

The Java virtual machine 424 is used as an interpreter to provide portability to Java applications. In general, developers design Java applications as hardware independent software modules, which are executed Java virtual machines 424. The Java virtual machine layer 424 is developed to operate in conjunction with the native operating system 426 of the particular hardware 428 on which the multimedia framework system 400 is to run. In this manner, Java applications 402 can be ported from one hardware device to another without requiring updating of the application code.

As shown in FIG. 4, the multimedia framework module 406 can provide playback using a plurality of data formats, including MPEG, MIDI, and FLASH. However, all these data formats may not be required for some applications 402. For example, a particular application may only require playback using the MPEG data format, In such circumstances the MIDI player 420 and the FLASH player 422 would not be required. Thus, the embodiments of the present invention allow the user to obtain a customized JAR file that provides the functionality required by the application 402, but removes class files for functions not needed by the application 402.

Figure 5:
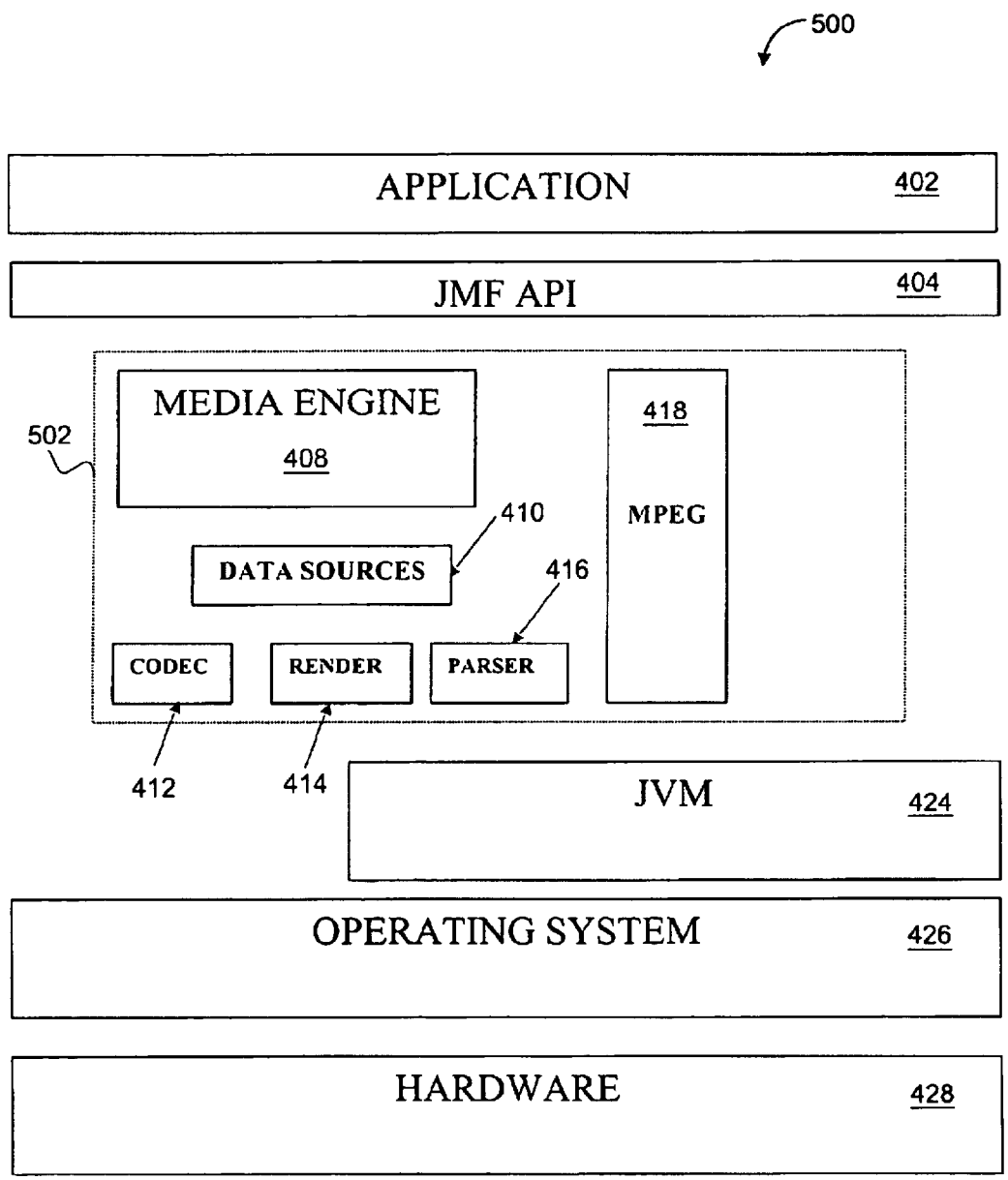
FIG. 5 is a block diagram showing a custom multimedia framework system, in accordance with an embodiment of the present invention.

FIG. 5 is a block diagram showing a custom multimedia framework system 500, in accordance with an embodiment of the present invention. Similar to the multimedia framework system 400, the custom multimedia framework system 500 includes an application layer 402, a Java multimedia framework API 404, a custom Java multimedia framework module 502, a Java virtual machine layer 424, an operating system layer 426, and a hardware layer 428.

The custom Java multimedia framework module 406 includes a media engine 408, data sources 410, a codec 412, renderer 414, and a parser 416. However, since the application 402 of the example of FIG. 5 does not require the MIDI player 420 or the FLASH player 422, the custom Java multimedia framework module 502 does not include the MIDI module 420, or the FLASH module 422. By analyzing the class files of a JAR file, the embodiments of the present invention can allow the user to select the required functionality and generate JAR files customized specifically for a particular application 402.

Figure 6:
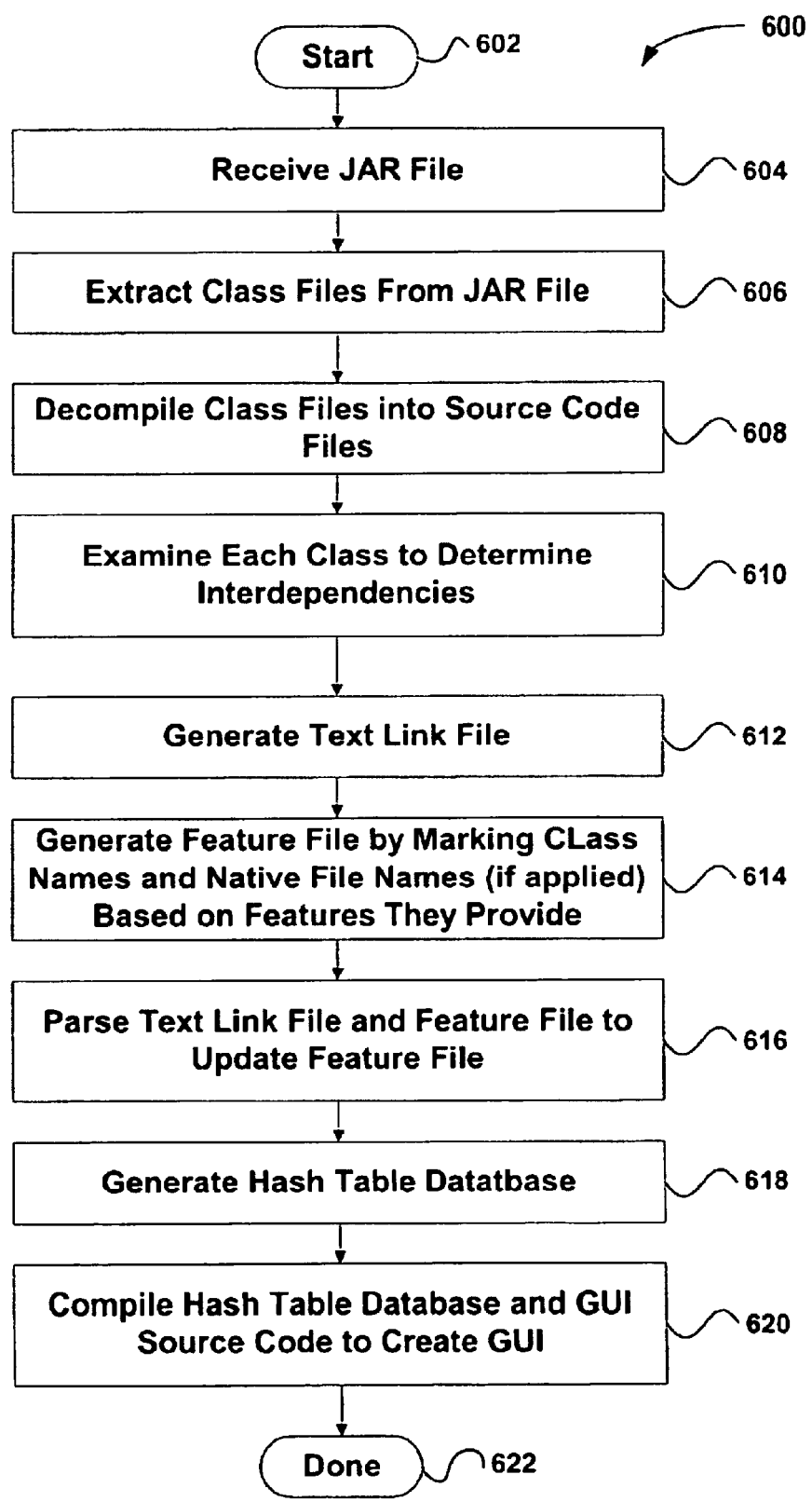
FIG. 6 is a flowchart showing a method for customizing Java API implementations, in accordance with an embodiment of the present invention.

FIG. 6 is a flowchart showing a method 600 for customizing Java API implementations, in accordance with an embodiment of the present invention. In an initial operation 600, preprocess operations are performed. Preprocess operations include creating Java class files, compressing the class files into a Jar file, and other preprocess operations that will be apparent to those skilled in the art.

In operation 604, a JAR file is obtained, along with related native files required for implementation using specific hardware. As described above, Java employs a platform independent file format that concatenates and compresses many Java classes, image, audio and other information into one file called a JAR file. One of the main attributes of the JAR file design is to reduce the number of HTTP connections that need to be opened, thus reducing download times. The file format for the JAR file is the popular ZIP format and can be used as a general archiving tool.

In operation 606, the class files are extracted from the JAR file. The compressed class files comprising the JAR file are extracted and decompressed. Techniques for extracting class files and decompressing class files are well known to those skilled in the art. The extracted class files are then decompiled, in operation 608. The class files are decompiled into source code files using a decompiler. As with extraction and decompression, techniques for decompiling object code and class files are well known to those skilled in the art. For example, a Java decompiler (JAD) can be used to decompile the class files into source code files.

Class interdependencies are determined in operation 610. Each class source code file generated in operation 608 includes a list of classes that the current class makes use of during execution. Thus, the current class is dependent on the listed classes, which must be present for the current class to function properly. In operation 610, each class source code file is examined to determine dependencies for each class in the framework.

Figure 7A:
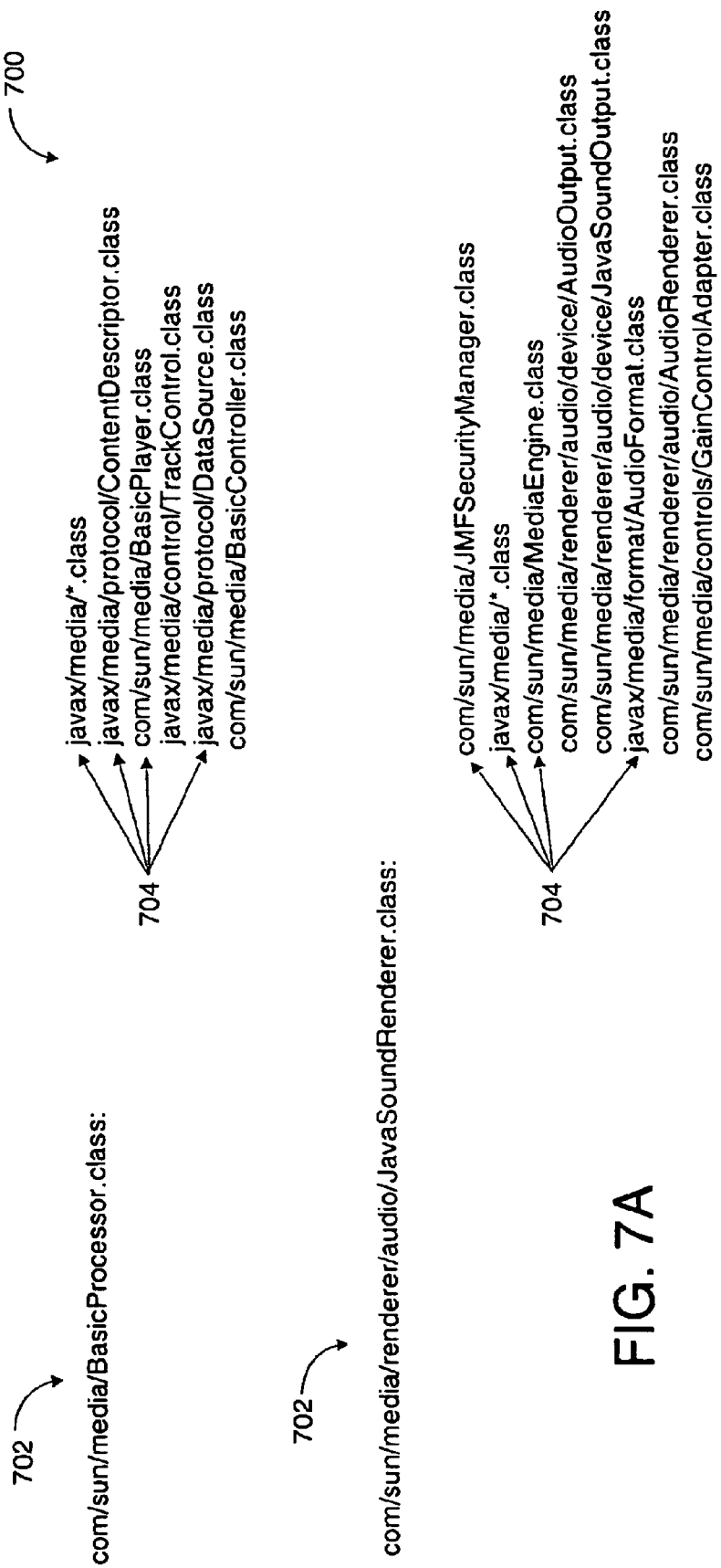

A text link file is then generated using the interdependencies, in operation 612. The text link file lists the class name and the classes on which the class depends for each class in the JAR file. FIG. 7A is a diagram showing a portion of an exemplary text link file 700, in accordance with an embodiment of the present invention. As shown in FIG. 7A, the text link file 700 lists a class name 702 for each class comprising the JAR file. In addition, for each class name 702, the text link file 700 lists the dependency classes 704 on which the class 702 depends. In other words, each class 702 will utilize the corresponding dependency classes 704 during execution. Thus, if a particular class 702 is to be included in a custom JAR file, the corresponding dependency classes 704 should also be included in the JAR file to ensure proper operability of the class 702.

In addition, the class source code files are analyzed to determine if any dynamic inter-class dependencies are present. Dynamic inter-class dependencies are introduced via Java's Reflection API, which allows dynamic loading of a Java class during runtime using the method Class.forName (className). Thus, the decompiler can miss these dynamic interdependencies in operation 608. Once the dynamic interdependencies are detected, the text link file is updated accordingly. The newly detected dynamically loaded classes are added to the dependency class list. For example, FIG. 7B shows a portion of the initial text link file before the dynamic inter-class dependencies are analyzed.

The analysis tool finds that in com/sun/media/renderer/video/AWTRenderer.java, there is the following line:

Class cls=Class.forName
  ("com.sun.media.renderer.video.Java2DRenderer").

Thus, in the runtime, the classloader will load the class com.sun.media.renderer.video.Java2DRendererer as well. Therefore, com/sun/media/renderer/video/Java2DRenderer.class is added to the dependency class list of com/sun/media/renderer/video/AWTRenderer.class, as shown in FIG. 7C.

Furthermore, the class source code files are analyzed again to determine if any dependency on native module files is present. This type of dependency is introduced by explicitly loading native modules in Java source code by calling method System.loadLibrary (nativeModuleName). These native modules are as important as dependent class files. Without them, the Java class may not operate properly. Thus, once the dependencies on the native modules are detected, the native module file names are added to the dependency list in the text link file. For example, FIG. 7D shows a portion of text link file before native module dependencies are analyzed. The analysis finds that in com/sun/media/renderer/autio/JavaSoundReneerer.java there are the following lines:

System.loadLibrary("jmutil");
System.loadLibrary("jsound");

Thus, in the runtime, the classloader will load native modules jmutil.dll and jsound.dll if running on Windows, and libjmutil.so and libjsound.so if running on Solaris. Thus, jmutil.dll, jsound.dll, libjmutil.so and libjsound.so are added to the dependency list of com/sun/media/renderer/audio/JavaSoundRenderer.class, as shown in FIG. 7E.

Referring back to FIG. 6, each class/native module is then marked to identify the features that depend on the class/native module, in operation 614. Embodiments of the present invention determine what features are provided by the files comprising the JAR file. FIG. 8 is a diagram showing a portion of an exemplary feature file 800, in accordance with an embodiment of the present invention. As shown in FIG. 8, the feature file 800 includes a list of class names and native module file names 702. Specific names 702 are initially labeled with feature markers 802 that indicate the features the particular class/native module facilitates. For example, the class "JavaSoundRenderer.class" is marked with the feature marker "JSRENDER" indicating that this class provides the Java sound renderer feature. So are native module files libjsound.so and jsound.dll.

Referring back to FIG. 6, the text link file and the feature file are parsed to link each class to the features the class facilitates, in operation 616. In particular, the text link file is analyzed to determine the classes on which each initially marked class file 702 depends. These classes are then marked in the feature file with the feature marker of the initially marked class. FIG. 9 is a diagram showing an updated feature file 850, in accordance with an embodiment of the present invention. The native module files .so and .dll are updated at this point too, in exactly the same manner as class's. As shown in FIG. 9, the class "AudioRenderer.class" has been marked with the feature marker 802 "JSRENDER" because the "AudioRenderer.class" is one of classes on which the JavaSoundRenderer.class depends. Further, the other classes/native files on which the JavaSoundRenderer.class depends, as listed in the text link file, are similarly marked with the feature marker "JSRENDER." It should be noted that each class/native file may be labeled with multiple feature markers 802 because a class may provide functionality to multiple features.

Figure 10:
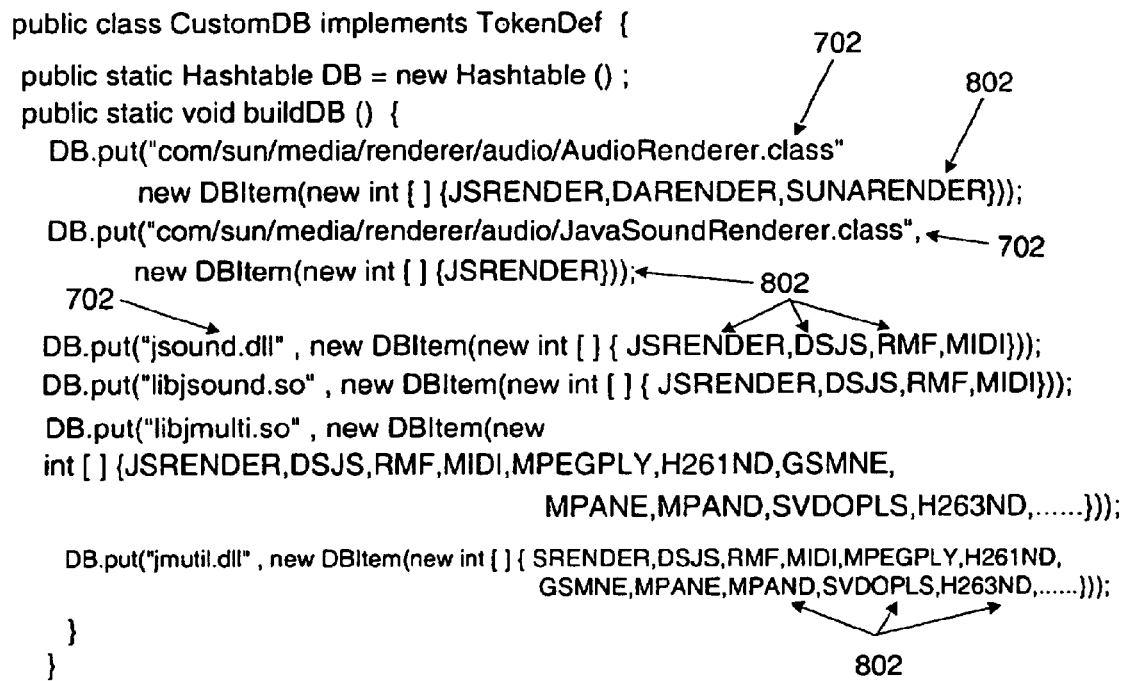
FIG. 10 is a diagram showing a portion of an exemplary hash table database, in accordance with an embodiment of the present invention.

In operation 618, a hash table database is generated based on the feature file. FIG. 10 is a diagram showing a portion of an exemplary hash table database 1000, in accordance with an embodiment of the present invention. The hash table database 1000 in FIG. 10 is a Java source code file that can be compiled by a Java compiler. As shown, each class/native module 702 listed in the hash table database 1000 is associated with one or more feature markers 802, similar to the association within the feature file 850. In this manner, whenever a particular feature is selected by a user, all the class files 702 associated with the feature, as indicated by the feature markers 802, will be included in the subsequently created customized JAR file. In addition, all the native module files 702 associated with the feature, as indicated by the feature markers 802, are included in the list of required native files accompanying above customized JAR.

Figure 11:
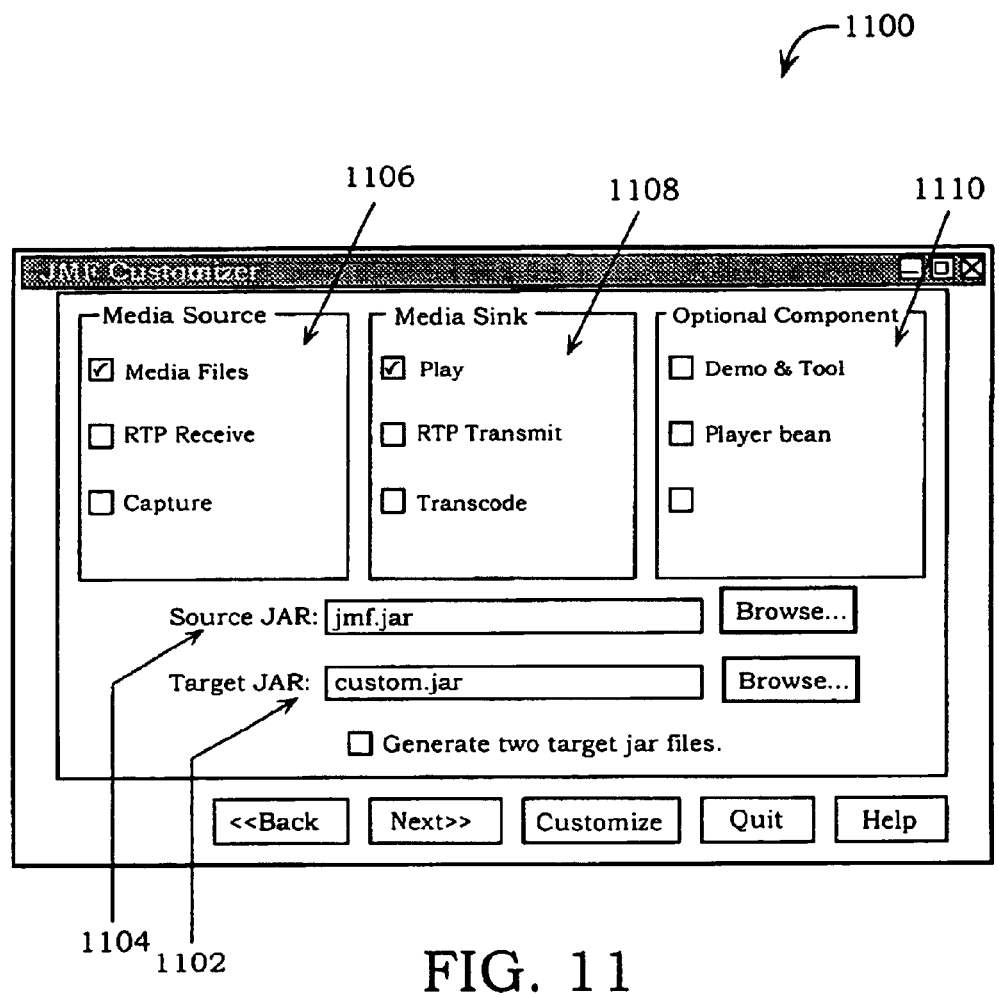
FIG. 11 is screen shot showing an exemplary GUI for custom JAR creation, in accordance with an embodiment of the present invention.

Referring back to FIG. 6, the hash table database is compiled along with user interface code to create a user interface to facilitate custom JAR creation, in operation 620. FIG. 11 is screen shot showing an exemplary graphical user interface (GUI) 1100 for custom JAR creation, in accordance with an embodiment of the present invention. The GUI 1100 shown in FIG. 11 allows a user to customize a JAR file 1102 based on a Java Media Framework JAR file 1104. Specifically, the GUI is divided into broad areas of Java Media Framework functionality, from which the user is allowed to select. These areas of functionality include Media Source functionality 1106, Media Sink functionality 1108, and Optional components 1110. Within each of these broad categories are further functionality subdivisions. In particular, the Media Source 1106 category determines what types of source media will be needed and is subdivided into Media files, RTP Receive, and Capture capability. The Media Sink 1108 category determines where the processed results will go and is subdivided into Play, RTP Transmit, and Transcode, which is saving to a file. Optional components 1110 include Demo & Tool and Player Bean. The Demo & Tool can be the demo player JMStudio and associated software tools that are often bundled with a JMF JAR file. Player Bean can be the JavaBean components in which JMF Player is encapsulated, bundled with JMF JAR file. When a user develops a JMF application/applet, these components may not be needed.

In use, a user determines the functionality needed in a particular application. The user can then utilize the GUI 1100 to select the required functionality for the application. For example, if the application was designed to use only media files as a media source, and only allow the media files to be played, not recorded to a file or transmitted, the user could select the Media files from the Media Source 1106 category and Play from the Media Sink 1108 category.

In some embodiments, the GUI 1100 could comprise multiple viewable pages of selectable functionality. For example, pages could be included for selecting a transmission protocol, selecting particular decoders to include, audio renderers, and other components that will be apparent to those skilled in the art. Using the embodiments of the present invention, JAR files can be analyzed and hash table databases created based on the classes and interdependencies. Then, the user selections from the GUI 1100 can be collected and used to select the needed files from the hash table database. These class files can then be included in the new customized JAR file, which can be accompanied by a list of necessary native module files if applied.

Embodiments of the present invention may employ various computer-implemented operations involving data stored in computer systems to drive computer software, including application programs, operating system programs, peripheral device drivers, etc. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 12:
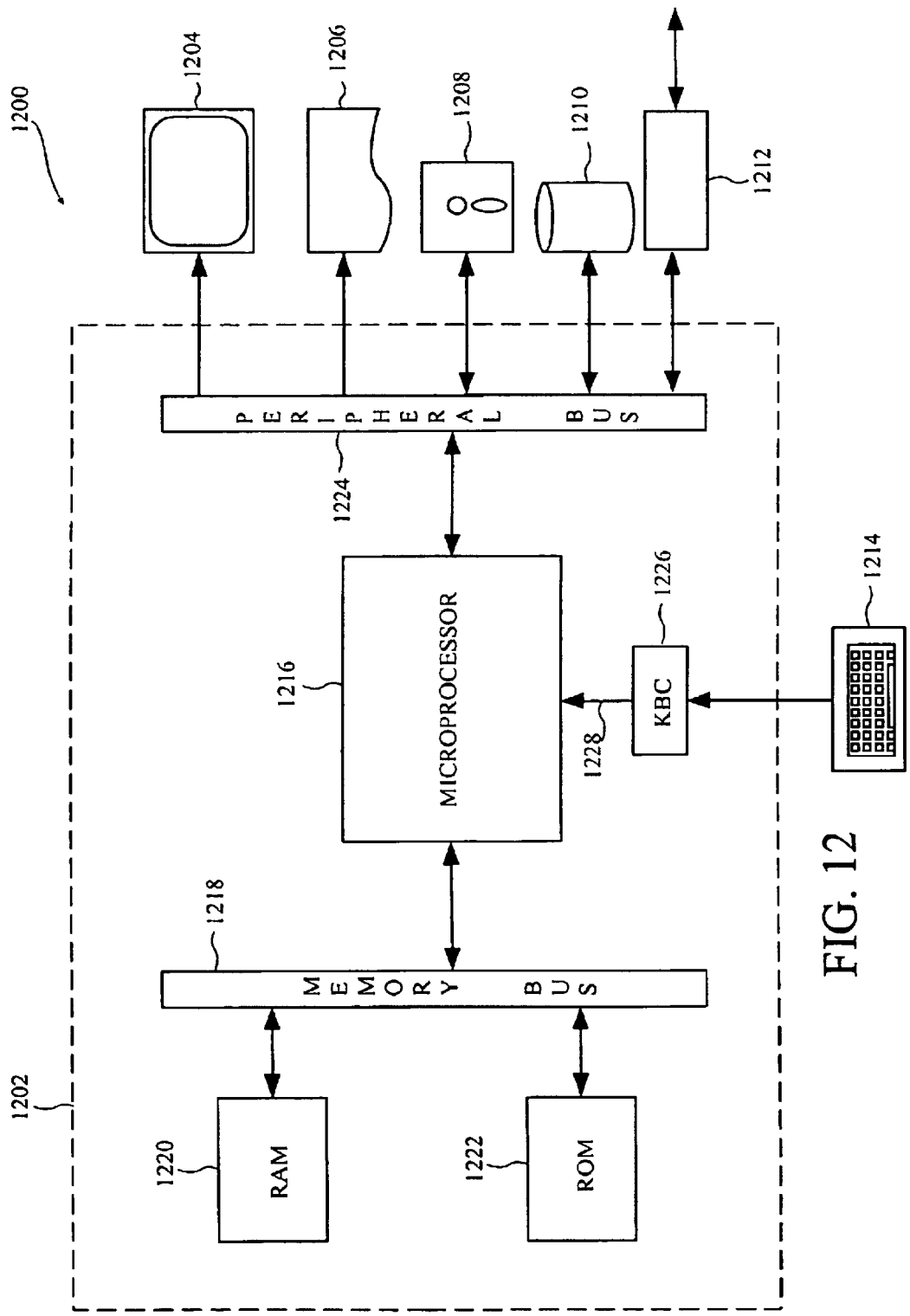
FIG. 12 is a block diagram of an exemplary computer system for carrying out the processing according to the invention.

FIG. 12 is a block diagram of an exemplary computer system 1200 for carrying out the processing according to the invention. The computer system 1200 includes a digital computer 1202, a display screen (or monitor) 1204, a printer 1206, a floppy disk drive 1208, a hard disk drive 1210, a network interface 1212, and a keyboard 1214. The digital computer 1202 includes a microprocessor 1216, a memory bus 1218, random access memory (RAM) 1220, read only memory (ROM) 1222, a peripheral bus 1224, and a keyboard controller (KBC) 1226. The digital computer 1202 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1216 is a general purpose digital processor, which controls the operation of the computer system 1200. The microprocessor 1216 can be a single-chip processor or can be implemented with multiple components. Using instructions retrieved from memory, the microprocessor 1216 controls the reception and manipulation of input data and the output and display of data on output devices. According to the invention, a particular function of microprocessor 1216 is to analyze a JAR file and generate a text link file, feature file, and hash table database. The hash table database can then be compiled with GUI source code to provide a GUI that allows a user to select particular functionality within a JAR file to include in a customized JAR file, as described above.

The memory bus 1218 is used by the microprocessor 1216 to access the RAM 1220 and the ROM 1222. The RAM 1220 is used by the microprocessor 1216 as a general storage area and as scratch-pad memory, and can also be used to store input data and processed data. The ROM 1222 can be used to store instructions or program code followed by the microprocessor 1216 as well as other data.

The peripheral bus 1224 is used to access the input, output, and storage devices used by the digital computer 1202. In the described embodiment, these devices include the display screen 1204, the printer device 1206, the floppy disk drive 1208, the hard disk drive 1210, and the network interface 1212. The keyboard controller 1226 is used to receive input from keyboard 1214 and send decoded symbols for each pressed key to microprocessor 1216 over bus 1228.

The display screen 1204 is an output device that displays images of data provided by the microprocessor 1216 via the peripheral bus 1224 or provided by other components in the computer system 1200. The printer device 1206, when operating as a printer, provides an image on a sheet of paper or a similar surface. Other output devices such as a plotter, typesetter, etc. can be used in place of, or in addition to, the printer device 1206.

The floppy disk drive 1208 and the hard disk drive 1210 can be used to store various types of data. The floppy disk drive 1208 facilitates transporting such data to other computer systems, and hard disk drive 1210 permits fast access to large amounts of stored data.

The microprocessor 1216 together with an operating system operate to execute computer code and produce and use data. The computer code and data may reside on the RAM 1220, the ROM 1222, or the hard disk drive 1210. The computer code and data could also reside on a removable program medium and loaded or installed onto the computer system 1200 when needed. Removable program media include, for example, CD-ROM, PC-CARD, floppy disk and magnetic tape.

The network interface 1212 is used to send and receive data over a network connected to other computer systems. An interface card or similar device and appropriate software implemented by the microprocessor 1216 can be used to connect the computer system 1200 to an existing network and transfer data according to standard protocols.

The keyboard 1214 is used by a user to input commands and other instructions to the computer system 1200. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory (ROM), random-access memory (RAM), CD-ROMs, magnetic tape, and optical data storage devices. The computer readable medium can also be distributed over a network that couples computer systems so that the computer readable code is stored and executed in a distributed fashion.

Furthermore, the same or similar methods and apparatuses described above for programming a hardware device can also be used for performing other particular maintenance operations on the hardware device. For example, operations such as erasing a ROM, reading a ROM, or performing a checksum on a ROM can be performed.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for customizing an application program interface (API) implementation, comprising the operations of:

obtaining a plurality of class files, the class files capable of being used together to provide a plurality of functional behaviors to an application, wherein the plurality of class files comprise a first Java Archive (JAR) file;

associating a feature marker with each class file of the plurality of class files based on a functionality provided by the class file, wherein each feature marker indicates a particular functionality provided by the plurality of class files;

selecting particular class files from the plurality of class files based on the feature markers associated with the particular class files; and generating a second JAR file using the selected class files.

2. A method as recited in claim 1, wherein the second JAR file excludes class files from the plurality of class files that are not selected.

3. A method as recited in claim 2, wherein the plurality of class files form a first API implementation of a particular API, the particular API providing rules for the API implementation.

4. A method as recited in claim 3, wherein the class files comprising the second JAR file form a second API implementation of the particular API.

5. A method as recited in claim 4, wherein the second API implementation maintains the rules required by the API.

6. A computer-implemented method for customizing an application program interface (API) implementation, comprising the operations of:

extracting a plurality of class files from a first Java Archive (JAR) file, the class files capable of being used together to provide a plurality of functional behaviors to an application;

generating a link file listing interdependencies of the class files of the plurality of class files;

associating a feature marker with particular class files of the plurality of class files utilizing the link file, wherein class files dependent on a particular class file are associated with the same feature marker, and wherein each feature marker indicates a particular functionality provided by the plurality of class files;

selecting particular class files from the plurality of class files based on the feature markers associated with the particular class files; and generating a second JAR file using the selected class files.

7. A method as recited in claim 6, wherein the second JAR file excludes class files from the plurality of class files that are not selected.

8. A method as recited in claim 6, further comprising the operation of associating a feature marker with particular native files that are used in conjunction with the plurality of class files.

9. A method as recited in claim 8, further comprising the operation of selecting particular native files based on the feature markers associated with the native files.

10. A method as recited in claim 9, further comprising the operation of generating a list of required native files for a second JAR file.

11. A method as recited in claim 6, further comprising the operation of analyzing the plurality of class files to determine dynamic inter-class dependencies.

12. A method as recited in claim 6, wherein the plurality of class files form a first API implementation of a particular API, the particular API providing rules for the API implementation.

13. A computer program embodied on a computer readable medium for customizing an application program interface (API) implementation, comprising:

a code segment that receives a plurality of class files, the class files capable of being used together to provide a plurality of functional behaviors to an application wherein the plurality of class files comprise a first Java Archive (JAR) file;

a code segment that associates a feature marker with each class file of the plurality of class files based on a functionality provided by the class file, wherein each feature marker indicates a particular functionality provided by the plurality of class files;

a code segment that selects particular class files from the plurality of class files based on the feature markers associated with the particular class files; and a code segment that generates a second JAR file using the selected class files.

14. A computer program as recited in claim 13, wherein the second JAR file excludes class files from the plurality of class files that are not selected.

15. A computer program as recited in claim 14, wherein the class files comprising the second JAR file form an API implementation of a particular API, and wherein the API implementation maintains the rules required by the API.

* * * * *